No. 891,704. PATENTED JUNE 23, 1908.
J. T. JONES.
METHOD OF TREATING ORE.
APPLICATION FILED APR. 11, 1908.

2 SHEETS—SHEET 1.

No. 891,704. PATENTED JUNE 23, 1908.
J. T. JONES.
METHOD OF TREATING ORE.
APPLICATION FILED APR. 11, 1908.

2 SHEETS—SHEET 2.

Witnesses:
John Enders
Chas. H. Buell

Inventor:
John T. Jones,
By Dyrenforth, Lee, Chritton & Wiles
Attys.

UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF TREATING ORE.

No. 891,704.     Specification of Letters Patent.     Patented June 23, 1908.

Application filed April 11, 1908. Serial No. 426,454.

*To all whom it may concern:*

Be it known that I, JOHN T. JONES, a citizen of the United States, residing at Iron Mountain, in the county of Dickinson and State of Michigan, have invented a new and useful Method of Treating Ore, of which the following is a specification.

My object is to provide a simple and improved method of producing wrought iron direct from oxid of iron ores; and my invention consists, briefly stated, in first subjecting the ore to, more or less nearly complete, reduction in a deoxidizing atmosphere at a temperature too low to melt either the slag making constituents or metallic iron, then subjecting the resultant spongy mass to a higher temperature which will render fluid the slag making constituents but not the metallic iron, and then rolling and squeezing the mass to work out the slag.

In carrying out of my method on a commercial scale it is necessary to employ a furnace, or a plurality of furnaces and, for the purpose of illustration merely, I show in the accompanying drawings furnace structures in which the steps of my method may be carried out.

Figure 1:
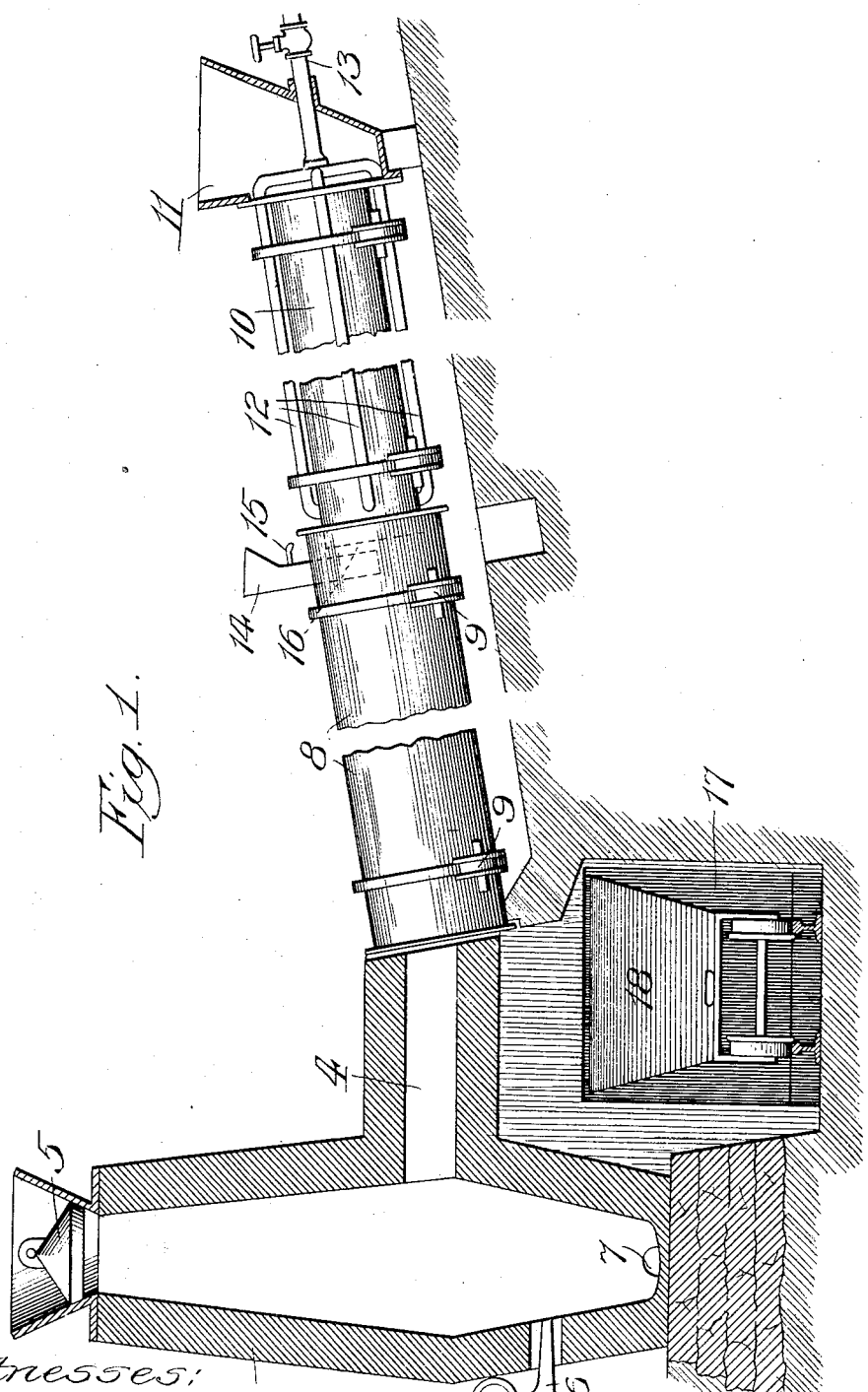
Figure 2:
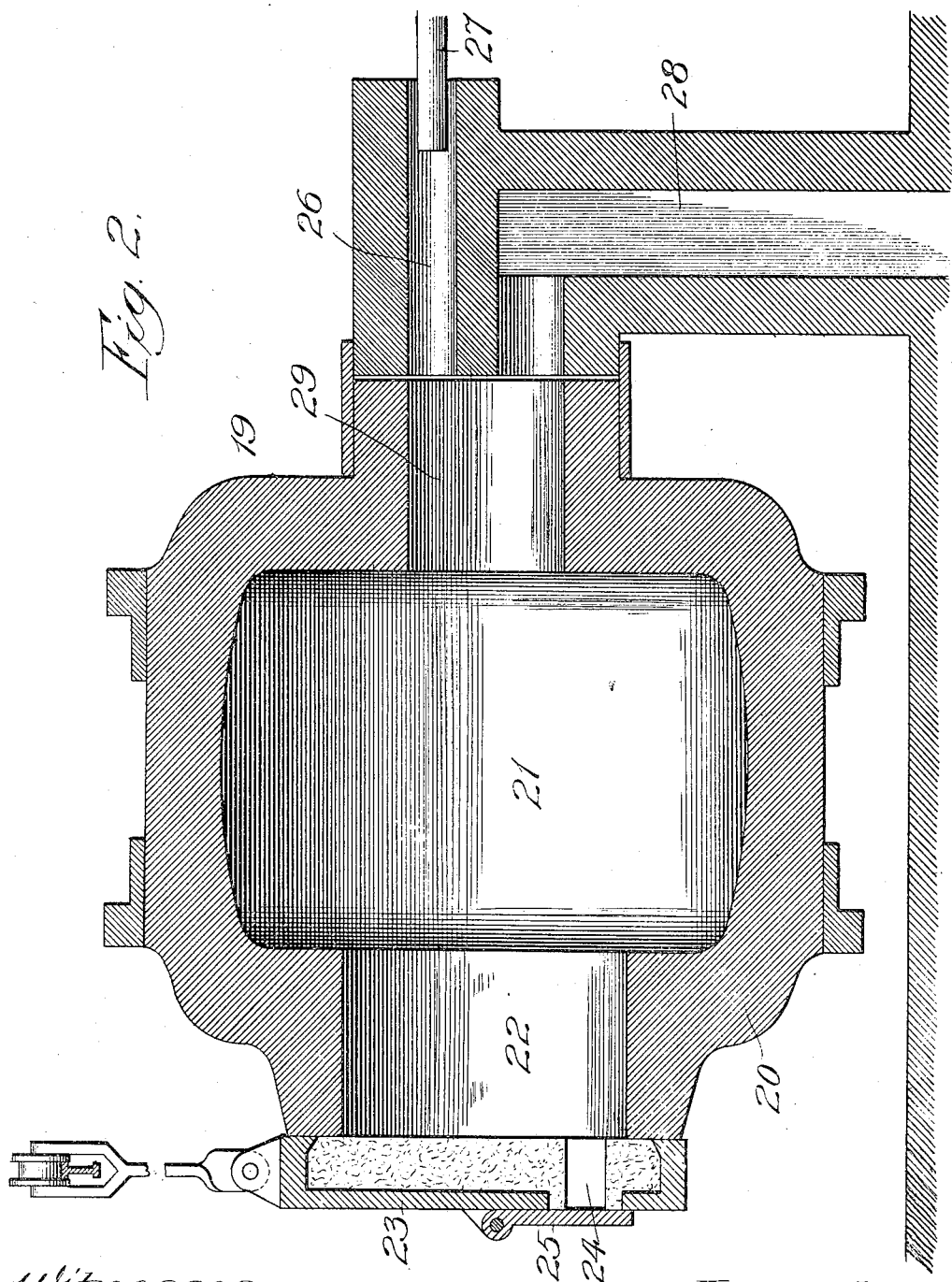

Referring to the drawings—Figure 1 is a view, partly sectional and partly in side elevation, of a furnace structure adapted for carrying out of the first steps of my improved method; and Fig. 2 a sectional view of a balling furnace of common construction for carrying out further steps of my method.

A furnace 3 for the production of reducing gas is provided with a gas-outlet flue 4. Fuel, as bituminous coal, is fed thereto through a bell-valve 5, and air to support combustion is forced in through the twyer 6. The unvolatilized products of the fuel may be drawn through the opening 7. An inclined rotary cylinder 8 abuts gas - tight against the mouth of the flue 4 and is supported upon rollers 9 in a common manner. The cylinder 8, in practice, may be, say, one hundred or more feet in length. 10 is a second cylinder forming, in effect, a continuation of the cylinder 8 and similarly mounted to rotate therewith. The upper open end of the cylinder 10 enters the lower part of a stationary ore-feeding hopper 11, the joint between them being gas-tight. Air-supplying pipes 12 enter the lower end-portion of the cylinder 10 and lead thereto from a common air-supply pipe 13. On the upper end-portion of the cylinder 8 is a hopper 14 provided with a valve 15, the hopper communicating with a pipe 16 which terminates at about the axial center of the cylinder. Below the open lower end of the cylinder 8 is a pit 17 into which cars 18 may be run to receive the material discharged from the cylinder 8.

The reducing gases generated in the furnace 3 pass through the flue 4 into the lower end of the cylinder 8, and, when they reach the cylinder 10, they are mixed with air from the pipes 12, giving to the gases an excess of oxygen. All the gases escape through the hopper 11. The cylinders have means, not shown, for rotating them slowly, and the ore fed through the hopper 11 descends slowly to the lower end of the cylinder 8. In its passage through the cylinder 10, the ore is subjected to an oxidizing atmosphere which tends to drive off sulfur and heat the ore to a high temperature. While descending through the cylinder 8, the ore is subjected to a reducing atmosphere which is maintained at a temperature sufficiently high to reduce the desired percentage of the iron oxids to metal, without, however, rendering either the metallic iron or slag producing constituents of the ore fluid.

The temperature of the gases passing through the cylinders is regulated within reasonable limits to produce the results I wish to obtain. Occasionally, as desired, I feed a more or less limited quantity of preferably bituminous coal into the upper end of the cylinder 8 through the valved hopper 14. As the ore passes through the upper end-portion of the cylinder 8, it is subjected to a reducing temperature which does not, however, reach that necessary to bind phosphorus to the metal. It is, however, high enough to free the volatiles from the hydro-carbon fuel fed through the hopper 14, and these volatiles mixed with the reducing gases from the furnace 3 tend to combine with any phosphoric acid in the ore and carry it off. Thus the ore as it descends through the cylinder 8 is not only reduced, but largely, at least, dephosphorized.

As the iron oxids are reduced to the metallic state, the reduced metal particles tend to agglomerate together and form structures of honeycomb form, while the other constituents of the ore adhere to, or become enveloped in, the interstices of the metallic lumps. After the ore reaches this sponge condition, it is discharged into the car 18. Care should be employed to prevent the entrance of a material quantity of air to the pit 17, when the cars are moved in and out, and to prevent air from entering the lower end of the cylinder 8 in volume sufficient to deteriorate the reducing gases entering the cylinder from the flue 4. When a car 18 is filled with reduced ore, its contents may be covered with coal-dust or the like, to exclude the atmosphere and prevent reoxidation of the ore.

To carry out the next step of my method, the rotary balling furnace 19 shown in Fig. 2 may be employed. This furnace is of common construction having a body-portion 20 which is mounted to rotate. In the body-portion is a chamber 21 having a charging opening 22 at one side closed by a normally stationary door 23. The door is mounted upon a stationary support to slide into and out of its closing position and contains a tap opening 24 closed by a swinging valve 25. In a stationary frame at the opposite side of the body-portion 20 is an inlet passage 26 to which extends a hydro-carbon burner 27. Below the passage 26 is an outlet passage for gases 28. The passages 26 and 28 register with a passage 29 to the chamber 21. In practice, the door 23 being opened, the contents of a car 18 are charged through the opening 22 into the chamber 21 when the door is again closed and the reduced spongy mass subjected to heat from the hydro-carbon burner 27. As the body-portion 20 is slowly rotated, the mass is rolled over and over, the temperature to which it is subjected being sufficient to render the slag making constituents fluid and to render the metal viscous, then pasty. The weight of the metal forming the mass tends to squeeze out the fluid slag as it forms, and when the slag bath rises above the outlet 24, it overflows, opens the valve 25 and escapes.

It is to be understood that if the ore is not primarily self-fluxing, suitable fluxing material must be mixed therewith, and it is desirable that the slag producing constituents of the ore or mass shall melt at a temperature much below that required for melting metallic iron, say under 2200° F. The temperature of the chamber 21 during this balling operation is maintained well above that required for rendering the slag making constituents fluid but below that necessary to render the metallic iron constituent of the mass more than pasty. When the mass has been thus squeezed and rolled until most of the slag is worked out, the resultant ball or "muck bar" is removed from the chamber 21 for further treatment as by rolling under a welding heat, to further eliminate slag if necessary.

I wish it to be understood that I do not limit my invention to the employment of the particular furnaces shown and described.

What I claim as new, and desire to secure by Letters Patent, is—

The method of treating iron ore, which consists in first subjecting the ore under deoxidizing conditions to a temperature that will reduce iron oxids to metal without rendering the slag making constituents fluid, then subjecting the reduced ore under a higher temperature which will render fluid the slag making constituents but not the metallic iron to a rolling and squeezing operation to work out the slag.

JOHN T. JONES.

In presence of—
L. G. KIRKLAND,
R. A. SCHAEFER.